Feb. 23, 1932.   V. TANASSO ET AL   1,847,049
SPECTACLE FRAME
Filed Jan. 28, 1929
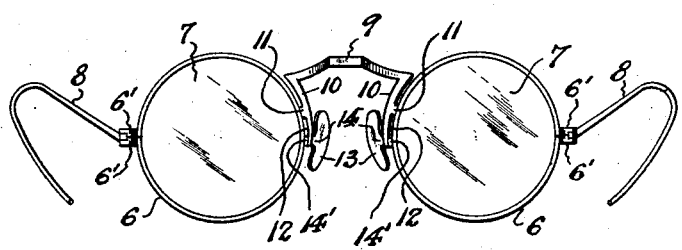
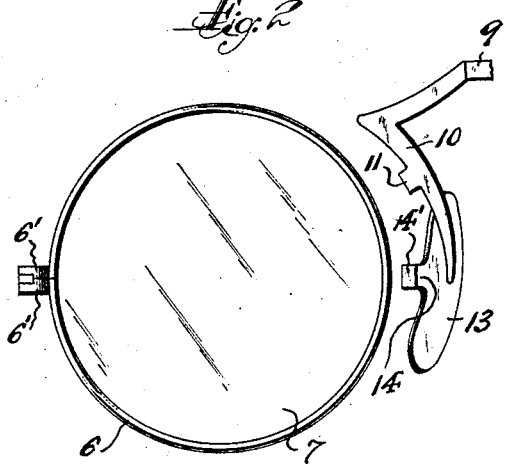
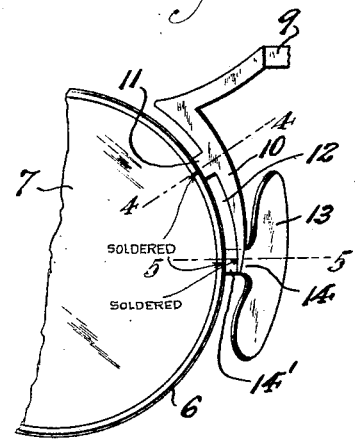
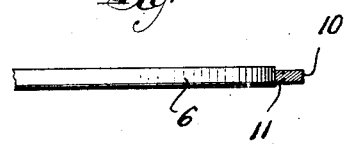
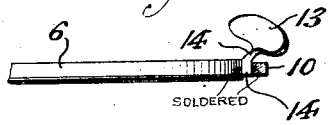
INVENTORS
Vincent Tanasso & Jacob J. Pomeranz,
BY
George D. Richards
ATTORNEY Patented Feb. 23, 1932

1,847,049

UNITED STATES PATENT OFFICE

VINCENT TANASSO, OF NEW YORK, AND JACOB J. POMERANZ, OF BROOKLYN, NEW YORK

SPECTACLE FRAME

Application filed January 28, 1929. Serial No. 335,550.

This invention relates to improvements in spectacle frames; and the invention has reference, more particularly, to a simple and durable construction of spectacle frame structure of the type provided with lens rims spaced apart by an intermediate nose bridge and having in combination therewith a novel arrangement of nose guard members or nose engaging frame supporting abutments.

The invention has for its principal object to provide a very simple construction of spectacle frame in which the desired parts are reduced to minimum number and are so shaped and assembled as to produce a strong, durable and substantially integral structure, with the exception of the pivoted temples with which said frames are usually provided.

The invention has for a further object to provide a novel construction of nose bridge adapted for attachment to the lens rims and having means to engage and assist in the anchoring support of the nose guard members relative to the lens rims.

Other objects of this invention, not at this time more particularly enumerated, will be clearly understood from the following detailed description of the same.

The invention is clearly illustrated in the accompanying drawings, in which:—

Figure 1 is a face view or front elevation of a spectacle frame made according to and embodying the principles of this invention; Figure 2 is an enlarged fragmentary view of portions of the frame structure disassembled; and Figure 3 is a similar view of the same parts in assembled relation; Figure 4 is in part an elevation and in part horizontal section, taken on line 4—4 in Figure 3; and Figure 5 is in part an elevation and in part horizontal section, taken on line 5—5 in Figure 3.

Similar characters of reference are employed in all of the hereinabove described views to indicate corresponding parts.

Referring now to said drawings, the reference character 6 indicates the lens rims, which are adapted to encircle and support the lens 7. The said rims 6 are discontinuous at their outer sides so that the same may be opened up for the insertion of the lens 7 thereinto. The meeting ends of the rims 6 are provided with the usual off-set perforate ears 6' adapted both to provide means for retaining the rims in closed embracing relation to the lens 7 as well as hinge knuckles for the attachment of temples 8 to the outer sides of the rims 6 in the usual way.

The reference character 9 indicates a nose bridge of any suitable design adapted to be connected to and intermediate the rims 6 to space the same in proper relation one to the other. Said nose bridge 9 is provided at its respective ends with downwardly extending arcuate arms 10 conforming in curvature substantially to the curvature of the lens rims 6 to which they are opposed when the nose bridge is in operative assembled relation to the latter. Integrally formed in connection with each arm 10, intermediate the ends thereof and at the outer sides thereof, are outwardly projecting off-set attachment lugs or abutments 11 adapted to abut the circumferences of the adjacent lens rims, and to be fixedly secured to the latter, as by solder or cement. The said off-set attachment lugs 11 not only serve as a point of connection between the nose bridge structure and the lens rims, but also to space the arms 10 of the former from the latter, thus providing an intermediate space 12, which is especially desired between the lower end portions of the arms 10 and the lens rims 6. I do not limit myself to any particular shape or to any particular dimensions with reference to the attachment lugs or abutments 11, so long as a receiving space is provided between the lower end portions of the arms 10 and the adjacent rims 6 for the reception of the supporting arms of nose-guard elements in the manner hereinafter set forth.

The reference character 13 indicates nose-guard elements which are provided with laterally off-set supporting arms 14. Said nose-guard elements 13 are made of metal, and may be of any suitable shape or conformation. The supporting arms 14 may be bent into such desired shape as will be calculated to rearwardly off-set the nose-guards to a proper position adapted to comfortably engage the nose of the wearer of the spectacles so as to support the spectacle frame and lenses thereof in operative relation in front of the wearer's eyes.

The free forward extremities 14' of the supporting arms 14 are adapted to be inserted in the space 12 between the lens rims 6 and the end portions of the arms 10 of the nose bridge 9, so that the latter parts abut opposite sides of said supporting arms 14. Said extremities 14' are thereupon fixedly secured in the described assembled relation by soldering or cementing, thus firmly anchoring the supporting arms at each side thereof, and for direct rearward extension so that the nose-guards are firmly secured and maintained in rearwardly off-set relation to the transverse plane of the spectacle frame.

It will be obvious from the above description that the several elements, thus making up the spectacle frame structure, are rigidly and firmly inter-related and mutually united to provide a substantially integral structure, which is very strong and durable, and yet which possesses a neat and attractive appearance. The nose-guard supporting arms 14, being embraced at opposite sides by the lens rims 6 and nose bridge arms 10, are very strongly attached and braced against breakage or other injury; the arrangement possessing the further advantage, that said supporting arms being so securely anchored and capable of being easily bent by the retail optician to carefully adjust the off-set position and angle of the nose-guards when fitting the frame to the wearer without risk of accidentally breaking off the nose-guards, or weakening the attachment of the same to the lens rims.

The novel spectacle frame may be and preferably is made of metal, although it will be understood that the elements thereof may be made, in whole or in part, of materials other than metal should it be so desired.

It will be obvious that many changes could be made in the above construction and in the shapes of the parts, and many apparently widely different embodiments of this invention could be made without departing from the scope thereof; it is intended, therefore, that all matter contained in the above description or shown in the accompanying drawings shall be interpreted as illustrative and not in a limiting sense.

We claim:—

In a spectacle frame, a pair of lens rims, a nose bridge intermediate said rims to space the same apart, said nose bridge having arcuate arms extending downwardly from its ends to lie in the plane of and extending adjacent said lens rims, said arcuate arms being formed with outwardly directed, integral attachment lugs positioned intermediate the length thereof, said attachment lugs lying in the plane of said lens rims and said arcuate arms and being fixedly secured at their outer ends to said lens rims, and nose-guard elements positioned rearwardly of the lower ends of said arcuate arms, said nose-guard elements having supporting arms extending forwardly and fixedly secured between the lower ends of said arcuate arms and said lens rims, said nose-guard supporting arms cooperating with said attachment lugs for holding said lens rims rigidly to said nose bridge while also serving to suitably space the lens rims therefrom.

In testimony that we claim the invention set forth above we have hereunto set our hands this 19th day of January, 1929.

VINCENT TANASSO.
JACOB J. POMERANZ.